United States Patent [19]
Ryan

[11] Patent Number: 4,916,736
[45] Date of Patent: Apr. 10, 1990

[54] METHOD AND APPARATUS FOR ENCRYPTING AND DECRYPTING TIME DOMAIN SIGNALS

[75] Inventor: John O. Ryan, Cupertino, Calif.

[73] Assignee: Macrovision Corporation

[21] Appl. No.: 203,676

[22] Filed: Jun. 7, 1988

[51] Int. Cl.⁴ ............................................. H04N 7/167
[52] U.S. Cl. ...................................... 380/11; 380/14; 380/15; 380/35
[58] Field of Search ........................ 380/11, 14, 15, 35

[56] References Cited

U.S. PATENT DOCUMENTS

| | | | |
|---|---|---|---|
| 1,981,114 | 11/1934 | Mitchell et al. ...................... | 380/35 |
| 2,547,598 | 4/1951 | Roschke . | |
| 2,857,455 | 12/1953 | Jolliffe . | |
| 2,972,008 | 4/1976 | Ridenour et al. . | |
| 4,070,693 | 1/1978 | Shutterly . | |
| 4,216,500 | 8/1980 | St. Louis . | |
| 4,283,740 | 8/1981 | Okada . | |
| 4,353,088 | 10/1982 | den Toonder et al. . | |
| 4,390,898 | 7/1983 | Bond et al. . | |
| 4,594,609 | 6/1986 | Romao et al. . | |
| 4,642,688 | 2/1987 | Lowry et al. .......................... | 380/11 |
| 4,736,420 | 4/1988 | Katznelson et al. ................. | 380/14 |

Primary Examiner—Stephen C. Buczinski
Attorney, Agent, or Firm—Townsend & Townsend

[57] ABSTRACT

Time sequential information signals, such as color video signals having a line timing reference and an active video portion, are encrypted by time shifting the active video signal portion towards and away from the line timing reference signal in psuedo-random fashion prior to broadcasting or recording on tape or disk and transmittal to the user. The signals are decrypted by an inverse time shifting technique. By limiting the amount of time shifting between lines, potential signal degradation for color video signals is minimized, and drop out compensation processing is minimally affected, so that the color resolution and picture quality are substantially unaffected.

Various levels of security are attainable, ranging from a simple security technique in which the intra field time shifting information is encoded along with the active video to a relatively sophisticated, high security level in which the number of decryption signal processing attempts and the time period within which decryption processing is permitted are limited.

50 Claims, 2 Drawing Sheets

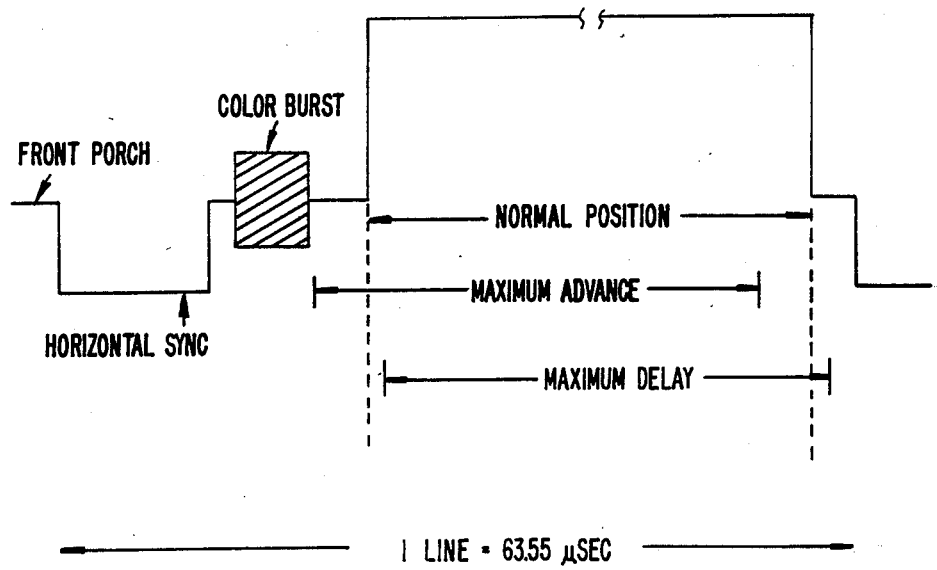
FIG._1.
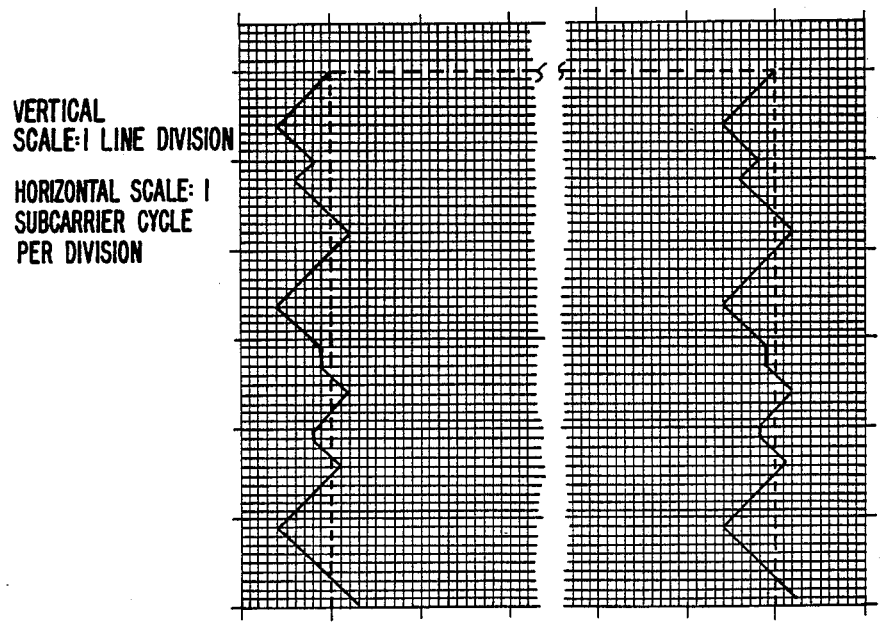
FIG._2.

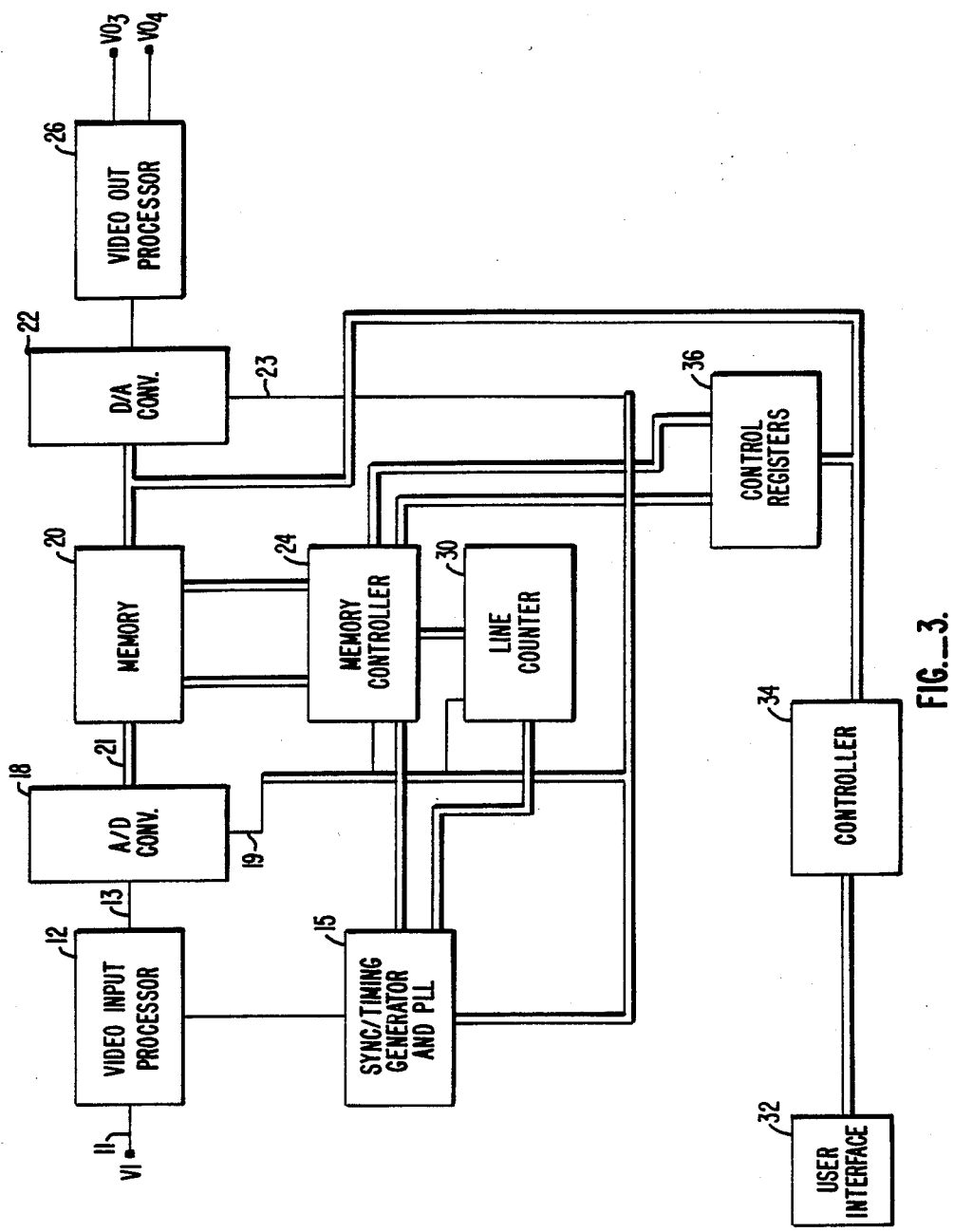
FIG._3.

METHOD AND APPARATUS FOR ENCRYPTING AND DECRYPTING TIME DOMAIN SIGNALS

BACKGROUND OF THE INVENTION

This invention relates to signal processing of time domain electronic signals, such as video information signals. More particularly, the invention relates to techniques for encrypting and decrypting such signals to prevent unauthorized use thereof.

Many techniques have been devised for encrypting and decrypting time domain information signals. The purpose for such techniques is always the same: viz., to prevent unauthorized use of the signals. In the case of video type information signals, the unauthorized use to be prevented is normally the visual display of the information signals for their entertainment or instructional value. Such signals are vulnerable to unauthorized use in a number of ways. For example, if the video signals are being broadcast over a satellite or microwave link, unauthorized users attempt to intercept the signals and view same without paying for the subscription service. In an effort to defeat such unauthorized uses of broadcast video information, several specific signal scrambling techniques have been successfully used.

Another means of conveying video information from one location to another is through the medium of video tape. For example, it is quite common for motion picture studios to send master videotapes of movies around the world. If the videotapes get stolen or "lost" in transit, a clear opportunity for piracy exists. It is therefore desirable to be able to scramble the video signal prior to recording it on videotape so that the tape can only be utilized by a user having a descrambler and appropriate codes. Such a scrambling system must have two important characteristics—it must be very secure and it must be compatible with the record/replay electronics of preferably all professional and consumer grade video recorders.

There are may known ways for scrambling video signals. Two simple techniques are sync suppression and sync inversion, each of which can, however, be readily defeated by using elementary video signal processing techniques and in any case cannot be recorded. Another technique is termed pseudo-random video-level inversion, which is relatively difficult to defeat but which suffers from the disadvantage of a severe loss of picture quality due to non-linearities in the record/playback process. Still another technique is line-order interchange, also known as line shuffling, in which the order of the lines in the raster scanned picture is shuffled. As an example, instead of transmitting the lines sequentially as line number 1, line number 2, line number 3, ... etc., the information might be transmitted as line number 182, line number 99, line number 4 ..., etc. Such a system can be made very secure (i.e., very difficult to defeat), but it cannot be used in any videotape format employing the color-under principle which relies upon line adjacency to obtain correct color rendition upon reproduction.

Still another technique is pseudo-random line rotation in which some of the lines of the picture selected in random fashion are transmitted in inverse temporal order (i.e., right to left), while the remainder are transmitted in the normal fashion (i.e., left to right). Yet another technique is termed line segmentation with pseudo-randomly chosen break points, in which each line is broken into two randomly chosen segments and the segments are sequentially transmitted with the right hand segment being transmitted first, followed by the left hand segment. Both of these video signal scrambling methods give rise to severe color contamination between the left and right hand sides of the picture when employed on any format which uses color-under recording.

In addition to the above disadvantages, the last three noted techniques suffer from the further disadvantage that the processing is incompatible with the drop out compensation signal processing employed in most video recorder devices. While, in principle, these three methods could be used for video signal processing formats which do not employ color-under recording, such as professional type B and type C one inch formats, such a use would require special drop out compensation circuitry in which drop out sensing and correction are controlled by the descrambling system. This would require special modification of playback equipment, which adds undesired cost and complexity to an encryption/decryption system.

None of the above-described video scrambling techniques fully meets the desired requirements for a video scrambling system in which (1) the scrambled video can be recorded and subsequently replayed on any video tape format—professional or consumer—and be descrambled on replay, with negligible loss of picture quality; and (2) the scrambling technique is virtually impossible to defeat by any unauthorized user.

SUMMARY OF THE INVENTION

The invention comprises a method and apparatus for providing a highly secure video type information encryption and decryption technique which is compatible with all video tape formats and transmission systems and is free of picture impairments caused by the interaction of the scrambling algorithm and the chrominance consecutive line averaging systems used in color—heterodyne recording.

From a method standpoint, the invention includes the encryption of information signals normally arranged as a succession of lines of active information, each line having a line timing reference, the method comprising the basic steps of individually time shifting at least some of the lines of the signals with respect to the line timing reference by selected amounts, and providing an indication of the time shifting performed in the time shifting step in order to enable subsequent decryption. For information signals which are video information signals containing line sync signal portions and color reference signal portions, the time shifting is inhibited during these portions of the individual lines. Similarly, the non-active portions of a field or frame of information. i.e., the vertical blanking portions, are not time shifted.

In order to ensure compatibility between the encryption method and other conventional signal processing techniques, in particular the color heterodyne system of video cassette recorders, the amount of time shift between adjacent lines is preferably limited to $\pm N$ subcarrier cycles where N is a whole number (0, 1, 2, etc). In the preferred embodiment, N is either 0 or 1. In addition, the maximum aggregate time shift of the active video is limited so that the active video does not overlap either the color burst or the horizontal sync reference portions of the individual lines.

The actual time shifting sequence selected is preferably a pseudo-random sequence, and the time shifting is performed in both the advance and the delay directions. This sequence can be applied on every line of both odd and even fields, or in some other order. In addition, different sequences can be used for the lines in an odd field than for the lines in an even field, and the sequences applied to given fields can be changed either as a function of time or as a function of the number of fields already encrypted. Further, the sequence can be applied to all of the lines of a given field or frame followed by a different time shifting of all of the lines of the next succeeding field or frame; or in multiples of fields or frames.

The method is preferably implemented by converting the analog video type information signals to digital form, storing these signals in an appropriate sized memory, reading the signals out from memory with the individual samples representative of the active video portion time shifted with respect to the horizontal sync and/or colorburst portions, and reconverting the signals thus read out from digital to analog form. After the encryption has been performed, the signals can be either communicated directly to the user over a suitable communication link or the signals may be recorded on tape or disk and physically transmitted to the user. At the decryption site, the signals are decrypted by a processor which is the inverse of the encryption process.

For a fuller understanding of the nature and advantages of the invention, reference should be had to the ensuing detailed description taken in conjunction with the accompanying drawings.

BRIEF DESCRIPTION OF THE DRAWINGS

FIG. 1 is a schematic diagram illustrating one line of video type information to which the invention applies;

FIG. 2 is a schematic diagram illustrating the effect of a pseudo-random time shifting of a portion of a frame of information; and FIG. 3 is schematic block diagram of an encryption/decryption unit.

DESCRIPTION OF THE PREFERRED EMBODIMENTS

The underlying principle of the invention can be best understood with reference to FIGS. 1 and 2. FIG. 1 illustrates one line of NTSC video information, with the active video portion of the line compressed along the horizontal scale. As seen in this FIG., one line of active video, which extends between the leading edge of the horizontal sync signals of adjacent lines, includes a color burst reference signal portion followed by the active video. According to the invention, it is the active video portion of each line which is time shifted with respect to other lines by a specific amount in accordance with a predetermined sequence. For example, the normal position of the active video is illustrated in FIG. 1. During encryption, this position is time shifted in either an advance direction (i.e., closer to the horizontal sync portion of the given line) or in a delay direction (i.e., toward the horizontal sync portion of the next succeeding line). In order to minimize any possible adverse effect on consecutive line averaging, on the performance of the conventional drop out compensation processing, and to preserve all of the active video in each line, maximum limits are placed on the relative and total amount of time shifting in the advance and delay directions. Thus, for example, where T is the duration of exactly one cycle of the color subcarrier frequency (approximately 280 nanoseconds for NTSC video), and N is a number chosen from the set consisting of $-1$, 0 and $+1$, the time shift of each particular line with respect to the previous line can be represented by the amount $NT$. A time shift of $+T$ or $-T$ can be interpreted as an advance or delay respectively of T seconds for the active portion of each line of information. As will be appreciated, the interval between the leading edge of horizontal sync and the end of the color burst is not time shifted.

In the preferred embodiment of the invention, the quantity N is a pseudo-randomly generated number. In this embodiment, the random number generator employed is constrained to guarantee that the maximum aggregate time shift of the active video in the advance direction does not exceed a first maximum value and in the delay direction does not exceed a second maximum value. In one specific embodiment these values are $6T$ and $-2T$, respectively, where T is the duration of one cycle of the color subcarrier frequency. As a consequence of the above constraints, the following advantages are obtained.

Firstly, since the chrominance shift between lines is limited to $+1$, 0 or $-1$ subcarrier cycles, the interaction with known consecutive line averaging systems is negligible. Secondly, there is exceedingly good correlation between the video signals on consecutive lines so that the performance of drop out compensators is not impaired. Thirdly, the limits placed on the maximum aggregate displacements ensure that none of the active video is lost and that the front porch is never less than one microsecond long.

FIG. 2 illustrates in schematic form the visual effectiveness of the above-described embodiment. As seen in this FIG., the dotted lines represent the top portion of a television raster. The jagged solid lines illustrate the manner in which the image is distorted during one field using a pseudo-random sequence generated in the above-noted manner. This level of distortion is sufficient to remove all entertainment value from a picture and to make face recognition very difficult, except where extreme close-ups are used. In addition, alphanumeric characters, such as titles, become very difficult to interpret.

There are several variations to the basic time shifting technique described above. For example, the effectiveness of the encryption technique can be significantly improved if the time shifting sequence used on odd fields is different from that used on even fields. The visual effect is that of a double image, which is exceedingly difficult to interpret. To further increase the effectiveness, the sequence can be changed either as a function of time or as a function of the number of fields or frames already processed by time shifting. For example, the time shifting sequence can be changed from one sequence to another as a function of time by keeping track using a real time clock and changing the sequence after a predetermined period of time has elapsed—for example one minute. Similarly, a counter can be used to keep track of the total number of fields or frames subjected to a given time shifting sequence, after which the sequence can be changed to a different sequence. Alternatively, the sequence can be changed every field or every frame. Still further, the time shifting sequence can be simplified by shifting all lines in a given field by a fixed amount and changing this amount from field-to-field in a psuedo-random fashion. The same technique can be conducted on a frame-by-frame basis, if desired, to further simplify the process. In addition, this technique can be further simplified by shifting all lines in several fields or frames by a fixed amount, and then changing this amount to a different value for several next succeeding fields or frames.

FIG. 3 illustrates a block diagram of a system incorporating the invention. As seen in this FIG., input video to be encrypted or decrypted is coupled to an input terminal 11 of a video input processor 12. Processor 12 functions to normalize the incoming video signal relative to gain. DC offset and bandwidth, and provides a stable low impedance buffer unit for the video appearing on output terminal 13. In addition, the incoming vertical and horizontal sync portions are separated from the input video by processor unit 12 and supplied as an input to a sync/timing generator and phase lock loop unit 15.

The output of processor unit 12 appearing on output terminal 13 is coupled to an analog to digital converter 18 in which the video is converted from analog to digital form at a preselected clock rate by means of an input sample clock signal supplied on clock input line 19. In the preferred embodiment, the clock frequency has been selected to divide each horizontal line into 910 elements (pixels) and also each color subcarrier cycle into four parts. Also, the A/D converter 18 may comprise a TRW 1048 type integrated circuit, which evaluates the input signal thereto once every clock signal and converts the video level into an eight bit digital word.

The output of converter unit 18 is coupled to an input port of a dual ported memory unit 20. Memory unit 20 is configured as a memory in which a word is written from the A/D converter 18 into the memory every memory cycle and a word is read from the memory unit 20 to a digital to analog converter unit 22 every memory cycle. The storage capacity of memory unit 20 should be at least equal to the number of multi-bit characters (bytes) required to store one complete line of video information at the selected clock rate. In the preferred embodiment memory unit 20 has a minimum storage capacity of 910 bytes for a clock frequency of four times subcarrier. Read/write control signals and multi-bit address signals are supplied to the memory unit 20 from a memory controller unit 24. The output of memory unit 20 is coupled to the input of a digital to analog converter 22, in which the eight bit digital words output from memory unit 20 are converted into analog samples at the clock rate by clock signals supplied from unit 15 on clock input line 23. The output of converter unit 22 is coupled to the input of an output video processor unit 26 in which the video signal is re-normalized with respect to bandwidth and DC-offset.

Sync timing unit 15 is used to generate the input clock signals used to provide the sample clock for A/D converter unit 18, the read and write clock signals for memory unit 20, and the clock signals for D/A converter unit 22. Preferably, unit 15 is comprised of a discrete phase detector, a number of sampling gates, an error amplifier and a crystal clock oscillator. The clock oscillator may comprise an AT&T type 127AJ circuit.

The above-described units are coupled to a user interface device 32, such as a keyboard terminal. via a controller unit 34 and a plurality of control registers 36. In one embodiment, the controller 34 comprises a read only memory containing a long random sequence of numbers each defining a particular offset. This ROM is read by means of an address counter which cycles the ROM through its memory locations in a sequential order. The ROM should preferably have thousands of address locations. In the encryption station version of the system of FIG. 3, controller 34 further includes a random number generator which is used to generate a starting address for the ROM in controller 34 for the first active line of each field. This random number is encrypted using any suitable encryption technique and encoded and inserted into one of the unused lines of the vertical blanking interval as suggested by the bus connection between controller 34 and the input to digital to analog converter 22. In addition, to add a higher level of security controller 34 may include means for generating a separate code, such as the two most significant address bits of a multi-bit address character, which specifies a particular block of addresses in the controller ROM for activation during decryption, This special code is communicated separately to the user at the decryption site for manual entry using the user interface 32. Also, in the decryption station version of the FIG. 3, system controller 34 includes a decoding unit which not only recognizes the block address selection code but also the first line address code embedded in one of the unused lines of the vertical blanking interval, which is used to set the first address of the controller 34 ROM in each field.

The function of the system during decryption is as follows. The operator activates the system by entering an operator code through the keypad in the user interface 32. The controller 34 stores this code and uses it to select the appropriate address block in the controller 34 ROM. At the beginning of each field, controller 34 decodes the starting line address code and the offset for the first line of active video is read from the controller 34 ROM. This offset is loaded into the stack of the control registers 36.

The sync/timing generator unit 15 extracts the horizontal and vertical timing information from the incoming video signal. The horizontal sync pulses are compared with the output of the line counter, which is clocked by the system clock (described above) and the difference is fed to the phase lock loop portion of unit 15 as an error voltage, thus precisely controlling the frequency and the phase of the clock signals. The vertical sync pulse is used to determine the start and the end of each video field. The line counter 30 not only provides the feedback for the phase lock loop, but also maintains the absolute count during each line.

The process is substantially identical for the scrambling mode and the descrambling mode. For descrambling, at the beginning of a field of information the original signals were not time shifted during the vertical interval, so the memory unit 20 is initially loaded and unloaded consecutively from location 0 through intra-line location 910 throughout this initial field period (21 lines for NTSC video) without any intra-line time shifting. At the beginning of the first line of active video, the first offset number is fetched from the control registers 36 and loaded into the address counter, which is a counter identical to the line counter but located in the memory controller unit 24. The offset is calculated to complement the offset originally applied to the same line of video and consequently will cancel out that effect. The prior line of information is read out from memory unit 20 by the memory controller 24 and the next line is read into memory unit 20 in its place in such a manner that the corrected line will overlay the previous line in a proper manner. At the start of the next line, a new offset number is fetched from the control register unit 36 and loaded into the address counter in the memory controller 24. The corrected line is read out, and the next consecutive line is entered into the memory unit 20. This sequence continues until the end of the field, after which the process begins anew.

As will now be apparent, the invention provides a completely secure technique or encrypting and decrypting video type signals, which is fully compatible with all video tape formats and transmission systems and is free of picture impairments caused by the interaction of the scrambling algorithm and the chrominance consecutive line averaging systems used in color - heterodyne recording. Consequently, the invention can be used in a wide variety of applications in order to provide secure video information. Various levels of security are possible. For example, for relatively low level security, a fixed scrambling algorithm can be used on each field of information. For a higher level, the scrambling sequence can be changed as a function of time or as a function of the number of fields or frames already encrypted. Still further, different encryption sequences can be used for odd frames and even frames, and each sequence can be periodically changed for each frame, either as a function of time or the number of fields already encrypted. Still further levels of security can be obtained by generating coded control information which requires a specific decryption unit to decrypt the information, and by time dating the information so that the decryption will fail before a certain specified date or after a certain specified date. Also, additional control information can be included to permit decryption of the information only a preselected number of times, after which the information will be simply erased, destroyed, or the like.

The decryption control information can be conveyed to the user in a number of ways. As an example, the authorization code information may be transmitted from a control computer to a user unit via a modem or other communication link or verbally by telephone. For information which is not recorded but is broadcast over a communication link, the information for the authorization code may likewise be transmitted over the same communication link or via a different link or a different medium (such as through the mail). Other combinations will occur to those skilled in the art.

While the above provides a full and complete description of the preferred embodiment of the invention, various modifications, alternate constructions and equivalents will occur to those skilled in the art. For example, while the limitations on the maximum accumulated amount of time shifting to color video signals have been specified as 6T and −2T. other values can be selected such as 15T and −4T for monochrome NTSC signals. The considerations on selecting appropriate limits for the maximum accumulated amount include an analysis of the desired tolerances in the signal timing, which varies with the type of video signals—e.g., NTSC, PAL or SECAM. For NTSC type video signals, the alloted tolerance between the end of active video and the leading edge of the horizontal sync pulse (the "front porch" time) is about 1.6 microseconds, which is approximately 5 cycles of subcarrier. If the "front porch" time is not required, the maximum accumulated delay can thus be 5 cycles. Similarly, for monochrome NTSC signals the line period normally occupied by the color burst reference signal is available for advance time shifting. In addition, for color NTSC video signals the time shift between adjacent lines should be limited to one cycle of subcarrier for best color resolution and drop out compensation performance. If less resolution or poorer drop out compensation performance or both can be tolerated, this amount of inter-line time shifting can be increased. Therefore, the above descriptions and illustrations should not be construed as limiting the scope of the invention, which is defined by the appended claims.

What is claimed is:

1. A method for encrypting video information signals to prevent unauthorized use thereof, said signals being normally arranged as a succession of lines of active information, each line having a line sync portion, said method comprising the steps of:
    (a) individually time shifting the active information portion of at least some of the lines of said signals with respect to the line sync portion by selected amounts and inhibiting time shifting of the line sync portion; and
    (b) providing an indication of the time shifting performed in step (a) to enable subsequent decrypting.

2. The method of claim 1 wherein said information signals are video information signals containing a color reference signal portion, and wherein said step (a) includes the step of inhibiting time shifting of the color reference signal portion of the individual lines.

3. The method of claim 1 wherein said step (a) further includes the step of limiting the accumulated amount of time shifting in each temporal direction to a predetermined maximum value.

4. The method of claim 3 wherein the maximum value in one temporal direction is different from the maximum value in the opposite temporal direction.

5. The method of claim 4 wherein the maximum value in said one temporal direction is 6T and the maximum value in said opposite temporal direction is −2T, where T is a predetermined time period substantially less than the temporal duration of one line of information.

6. The method of claim 5 wherein said information signals are video information signals having a color reference signal portion of a predetermined frequency: and wherein T equals the duration of one cycle of said color reference signal portion.

7. The method of claim 1 wherein said information signals are video information signals containing a plurality of lines of non-active video, and wherein said step (a) includes the step of inhibiting time shifting of the non-active video lines.

8. The method of claim 1 wherein said selected amounts are limited to +T, −T, and zero, where T is a predetermined time period substantially less than the temporal duration of one line of information.

9. The method of claim 8 wherein said information signals are video information signals having a color reference signal portion of a predetermined frequency: and wherein T equals the duration of one cycle of said color reference signal portion.

10. The method of claim 1 wherein said step (a) of time shifting is performed in a predetermined sequence.

11. The method of claim 10 wherein said predetermined sequence is pseudo-random.

12. The method of claim 10 wherein said step (a) of time shifting includes the step of changing said predetermined sequence to another sequence as a function of time.

13. The method of claim 10 wherein said information signals are arranged in groups of lines; and wherein said step (a) of time shifting includes the step of changing said predetermined sequence to another sequence as a function of the number of groups time shifted.

14. The method of claim 10 wherein said information signals are grouped into at least two subgroups: and wherein said step (a) of time shifting includes the steps of using a first predetermined sequence to time shift lines in one sub-group, and using a second predetermined sequence to time shift lines in a second subgroup.

15. The method of claim 14 wherein said step (a) of time shifting includes the step of changing at least one of said first and second predetermined sequences to a third predetermined sequence as a function of time.

16. The method of claim 14 wherein said step (a) of time shifting includes the step of changing at least one of said first and second predetermined sequences to a third predetermined sequence as a function of the number of sub-groups time-shifted.

17. The method of claim 1 wherein said step (a) includes the steps of:
(i) storing successive samples of a selected line in a memory device;
(ii) time shifting said samples by a selected amount corresponding to the selected line; and
(iii) outputting the delayed samples from the memory device.

18. The method of claim 17 wherein said information signals are analog signals, and wherein said step (i) of storing is preceded by the step of converting said signals from analog to digital form.

19. The method of claim 18 wherein said step (iii) of outputting is followed by the step of converting said samples from digital to analog form.

20. The method of claim 18 wherein said step (b) includes the steps of:
(i) storing successive samples of a selected encrypted line in a memory device:
(ii) restoring the original temporal position of each time shifted sample: and
(iii) outputting the restored samples from the memory device.

21. The method of claim 20 wherein said encrypted information signals are analog signals, and wherein said step of storing is preceded by the step of converting said analog signals from analog to digital form.

22. The method of claim 21 wherein said step of outputting is followed by the step of converting said samples from digital to analog form.

23. A method of decrypting previously encrypted information signals to permit use thereof, said encrypted information signals comprising encrypted versions of original video information signals arranged as a succession of lines of active information, each line having an active information portion and a line sync portion, said encrypted signals having been produced by time shifting the active information portion of at least some of the lines of the original information signals with respect to the line sync portion by selected amounts and inhibiting the time shifting of the line sync portion, the direction and magnitude of the time shifting having been established during encryption, said decrypting method comprising the steps of:
(a) providing an indication of the time shifting performed on a given line; and
(b) restoring the original time relationship between the line sync portion and the line of information.

24. The method of claim 23 wherein said encrypted information signals are video information signals containing color reference signal portions which were not time shifted during the encrypting process; and wherein said step (b) of restoring includes the step of leaving the color reference signal portions undisturbed.

25. The method of claim 23 wherein said encrypted information signals are video information signals containing a plurality of lines of non-active video which were not time shifted during the encryption process; and wherein said step (b) of restoring includes the step of leaving the non-active video lines undisturbed.

26. A system for encrypting video information signals to prevent unauthorized use thereof, said signals being normally arranged as a succession of lines of active information, each line having a line sync portion, said system comprising:
means for individually time shifting at least some of the lines of said signals with respect to the line sync portion by selected amounts and inhibiting time shifting of the line sync portion; and
means for providing an indication of the time shifting performed by said time shifting means in order to enable subsequent decryption.

27. The invention of claim 26 wherein said information signals are video information signals containing color reference signal portions, and wherein said time shifting means includes means for inhibiting the time shifting of the color reference signal portions.

28. The invention of claim 26 wherein said time shifting means includes means for limiting the accumulated amount of time-shifting in each temporal direction to a predetermined maximum value.

29. The invention of claim 28 wherein the maximum value in one temporal direction is different from the maximum value in the opposite temporal direction.

30. The invention of claim 29 wherein the maximum value in said one temporal direction is 6T and the maximum value in said opposite temporal direction is $-2T$, where T is a predetermined time period substantially less than the temporal direction of one line of information.

31. The invention of claim 30 wherein said information signals are video information signals having a color reference signal portion of a predetermined frequency: and wherein T equals the duration of one cycle of said color reference signal portion.

32. The invention of claim 26 wherein said information signals are video information signals containing a plurality of lines of non-active video, and wherein said time shifting means includes means for inhibiting time shifting of the non-active video lines.

33. The invention of claim 26 wherein said selected amounts are $+T$, and $-T$, and zero where T is a predetermined time period substantially less than the temporal duration of one line of information.

34. The invention of claim 33 wherein said information signals are video information signals having a color reference signal portion of a predetermined frequency; and wherein T equals the duration of one cycle of said color reference signal portion.

35. The invention of claim 26 wherein said time shifting means includes means for establishing a predetermined time shifting sequence for said lines.

36. The invention of claim 35 wherein said predetermined time shifting sequence is pseudo-random.

37. The invention of claim 35 wherein said time shifting means includes means for changing said predetermined time shifting sequence to a different sequence as a function of time.

38. The invention of claim 35 wherein said information signals are arranged in groups of lines; and wherein said time shifting means includes means for changing said predetermined time shifting sequence to a different sequence as a function of the number of groups time-shifted.

39. The invention of claim 35 wherein said information signals are grouped into at least two sub-groups: and wherein said establishing means includes means for establishing a first predetermined sequence for time shifting lines in one sub-group and for establishing a second predetermined sequence for time shifting lines in a second sub-group.

40. The invention of claim 39 wherein said time shifting means includes means for changing at least one of said first and second predetermined sequences to a third predetermined sequence as a function of time.

41. The invention of claim 39 wherein said time shifting means includes means for changing at least one of said first and second predetermined sequences to a third predetermined sequence as a function of the number of sub-groups time shifted.

42. The invention of claim 26 wherein said time shifting means includes means for storing successive samples of a selected line, means for changing the relative position of a stored sample with respect to the line sync portion by a selected amount corresponding to the selected line, and means for outputting the delayed samples from said storing means.

43. The invention of claim 42 wherein said information signals are analog signals, and wherein said system further includes means for converting said information signals from analog to digital form.

44. The invention of claim 43 wherein said system further includes means for converting the samples output from said storing means from digital to analog form.

45. A system for decrypting previously encrypted information signals to permit the use thereof, said encrypted information signals comprising encrypted versions of original video information signals arranged as a succession of lines of active information, each line having an active information portion and a line sync portion, said encrypted signals having been produced by time shifting the active information portion of at least some of the lines of the original information signals with respect to the line sync portion by selected amounts and inhibiting the time shifting of the line sync portion, the direction and magnitude of the time shifting having been established during encryption, said system comprising:
   means for providing an indication of the time shifting performed on a given line; and
   means for restoring the original time relationship between the line sync portion and the line of information.

46. The invention of claim 45 wherein said encrypted information signals are video information signals containing color reference signal portions which were not time shifted during the encryption process; and wherein said system includes means for inhibiting the operation of the restoring means when the color reference signal portions are presented thereto for processing.

47. The invention of claim 45 wherein said encrypted information signals are video information signals containing a plurality of lines of non-active video which were not time shifted during the encryption process; and wherein said system includes means for inhibiting the operation of said restoring means when said non-active video lines are presented thereto for processing.

48. The system of claim 45 wherein said restoring means includes means for storing successive samples of a selected line: means for restoring the original temporal position of each time shifted stored sample: and means for outputting the restored samples from the storing means.

49. The invention of claim 48 wherein said encrypted information signals are analog signals, and wherein said system further includes means for converting said signals from analog to digital form.

50. The system of claim 49 wherein said system further includes means for converting said samples output from said storing means from digital to analog form.

* * * * *